Patented Apr. 21, 1942

2,280,590

UNITED STATES PATENT OFFICE 2,280,590

PROCESS FOR THE PRODUCTION OF TITANIUM SOLUTIONS

Ignace Joseph Krchma, Wilmington, Del., assignor to E. I. du Pont de Nemours & Company, Wilmington, Del., a corporation of Delaware No Drawing. Application October 7, 1938, Serial No. 233,749

17 Claims. (Cl. 23—117)

This invention relates to a process for the preparation of titanium solutions, and more particularly to a process for rendering residual titanium liquors or muds and the chemicals employed in effecting their clarification capable of reuse.

In the titanium pigment industry, it is generally customary to subject titaniferous ores, such as ilmenite, to sulfuric acid attack at elevated temperatures, in order to convert the titanium and iron values of such ore to water-soluble sulfates. The sulfated mass is then leached with water or dilute titanium solution to obtain a solution containing relatively large amounts of titanium sulfate, ferrous sulfate and sulfuric acid. In addition, appreciable quantities of slimes or muds are contained in this solution and these can only be freed through clarification. This comprises subjecting the colloidally dispersed mud to coagulation through use of clarification reagents, as described, for example, in U. S. Patents 1,276,644, 1,633,621 or 2,111,788. Reagents specifically utilizable include sulfur, glue and the various acid-insoluble metallic sulfides, examples of the latter including those of copper, tin, arsenic and antimony. To be useful, it is necessary that the sulfide be relatively insoluble in the sulfuric acid which is present in the titanium solution. Though more desirable, sulfides have not been adopted in the art, but in fact have, to a large extent, been avoided, especially in view of their relatively expensive cost. Tin has been particularly avoided for this latter reason, leaving adaptable the more readily available elements, such as copper and arsenic. These two are also economically costly and as a consequence have not enjoyed general usage in the pigment industry.

It is an object of this invention to overcome these difficulties, to provide a novel type of process in which the use of metal sulfides as coagulating agents in titanium liquor clarification can be readily had and in a highly economical manner. A still further object is to provide a process which will permit of the reuse of these and other clarification chemicals by effecting their return to subsequently prepared titanium solutions. A further object is to provide a cyclic process for the clarification of titanium solutions which contain a heavy metal compound, in which such solutions are subjected to clarification by addition of a soluble sulfide, the resultant sulfide precipitate is separated and then returned for dissolution and reuse in subsequently formed solutions. Other objects will appear hereinafter.

These and other objects are attained in this invention which comprises subjecting a titanium salt solution, such as titanium sulfate, to clarification with the aid of an acid-insoluble sulfide and in accordance with procedures such as described in my previously issued U. S. Patent 2,111,788, or in accordance with those disclosed in U. S. Patent 1,633,621, recovering the insoluble sulfide or sulfide-containing muds therefrom and reemploying such recovered residues in the preparation of fresh quantities of titanium salt solutions.

In the preferred embodiment of my invention, a relatively small amount of arsenic is suitably incorporated in the residue, obtained from the reaction of sulfuric acid with a titaniferous ore such as ilmenite, particularly the muds, being the coagulated colloidal slimes which contain appreciable amounts of unreacted titanium produced in the purification or clarification of the sulfate solutions which result from the acid-ore attack. The treated, residual solution is then passed to an apparatus, such as described in my said U. S. Patent 2,111,788, wherein the same is treated with a suitable sulfide so that its sulfur may combine with the dissolved arsenic to form arsenic sulfide. The sulfide which is thus formed in situ effects desired coagulation of said residual muds, and these are then settled and separated from the main body of solution. Reuse of the arsenic, present in the settled material as the sulfide, is effected by putting the same into solution, along with further amounts of titanium sulfate from sulfated ore. This is preferably and desirably effected by returning such residual muds to a prior step in the process, such as the previous titanium attack or dissolving operation, and effecting sulfide decomposition by oxidation. As will be apparent, a cyclic process is thereby afforded, in which the heavy metal chemical is reused many times in the system.

In order that the invention may be more clearly understood, the following illustrative example is given, but not, however, in limitation of the invention:

*Example I*

The clarification of a solution was had by dissolving hydrogen sulfide in a titanium sulfate solution having a density of 52° Bé. and containing .2 grams of $As_2O_3$ per liter. The slimes were settled with the aid of a Dorr thickener tank, diluted with dilute sulfuric acid and again thickened. The second underflow was then filtered and the press cake reused in the system for the preparation of more titanium solution. In this portion of the process, the required amount of ground ilmenite was slurried with a strong sulfuric acid mixture within a large attack vessel. After the ore suspension was complete, a suitable quantity of additional acid was added in order to adjust the charge to desired acid strength. To this mixture, a sufficient amount of filter press mud such as that described was added to impart a concentration of about .5 g. of arsenic, calculated as $As_2O_3$, per liter of solution to be clarified, and the reaction initiated. The resulting sulfated mass was then subjected to dissolution in dilute, recovered acid. The solution obtained was maintained at not less than 20 grams of ferric iron per liter until dissolving was substantially complete, a sufficient amount of metallic iron being then added to completely reduce all of the iron to the ferrous condition and, in addition, 3 grams of $TiO_2$ per liter to the trivalent state. The solution was then examined to determine the state of the arsenic, which was found to be in solution, while all of the sulfide sulfur had been oxidized during processing. The gravity of the solution was adjusted to 52° Bé., and clarification, using hydrogen sulfide, effected as described.

While the invention has been illustratively described in connection with its preferred adaptation utilizing titanium sulfate liquors, it is also adapted for employment in the clarification of other salt solutions of titanium, such as the chloride. Similarly, while arsenic, an agent which is readily soluble in both ferric and trivalent titanium solutions, has been employed in the foregoing example, its use is merely preferred, and other agents or mixtures thereof, such as antimony and tin, likewise soluble in both ferric and trivalent titanium solutions, may be used in lieu thereof. Copper is also a useful type of agent in the invention and capable of reuse as a clarification chemical. However, it does not constitute a preferred agent because it is insoluble in trivalent titanium and therefore not quite as effective as the others, due to its tendency to become reduced to the metallic state. When copper is employed, it will be found to be present as finely-divided metallic copper and react with hydrogen sulfide to form copper sulfide. Clarification will result, however, even though the solution is reduced to the point where it contains considerable amounts of trivalent titanium. Preferably, and to offset this tendency of copper to reduce to the metallic state, control over and maintenance of a trace of ferric iron in the solution immediately preceding addition of the soluble sulfide is had. The amount of ferric iron usefully employable is preferably not less than about 0.05 nor more than about 2.0 grams per liter. Upon maintenance of these conditions, it will be found that effective recycling of copper can be had in the process without encountering any difficulty. When arsenic, antimony or tin are employed, the state of reduction of the solution need not be so narrowly controlled to obtain best results, and accordingly these agents constitute preferred chemicals in my invention. To procure optimum results in my invention, when employing these preferred agents I usually maintain between about 1 and 4 grams of $Ti_2O_3$ per liter during the clarification operation.

Preferably, the flocculating or coagulating chemical is added to the titanium solution either in its elementary state or as the oxide or sulfide. Although a specific amount of arsenic has been utilized in the foregoing example, it will be understood that this is not critical to the invention and that suitable variance may be resorted to. Generally, I contemplate employing in the invention from about .1 gram to 1 gram of chemical in the form of its oxide per liter of solution to be clarified. In the preferred adaptation, I resort to amounts ranging from about .2 to about .5 gram of agent in the form of its oxide per liter of solution to be clarified.

Preferably, the residual muds are returned to the acid-ore attack portion of the process, as contemplated in the concurrently filed application of Edward N. Kramer, Serial No. 233,747, in which event the clarification chemical is present during both the attack and dissolving operations, and, upon decomposition, the metal of the sulfide becomes soluble in the acid solution. I also preferably operate the dissolving operation in such manner that ferric sulfate is present during a portion of the time at least, so that it may react with the sulfide to thereby solubilize the same. The sulfide, in this event, acts as a reducing agent, since it reduces ferric sulfate to ferrous sulfate, as well as a source of clarification reagent. While I preferably operate in the manner indicated, it will be understood that suitable and well-known oxidizing agents, such as chlorine, hydrogen peroxide, potassium chlorate, nitric acid, etc., may be utilized for effecting decomposition of the sulfide and its consequent solubilization in the titanium solution.

Also, while I prefer to return the sulfide-containing mud as such to the attack, other procedures may also be adopted. Thus, I may first convert the sulfide-containing mud to the oxide or another compound of arsenic, copper, tin or antimony, so that decompositon does not necessarily occur during the solubilizing operation. Alternatively, I may also return the muds to the dissolving operation, thereby avoiding their presence during the attack and allow the ferric iron-containing solution to oxidize the arsenic or antimony sulfide, rendering the same soluble. This solution I may then pass on to the clarification operation where it is treated with a soluble sulfide and clarification obtained. While hydrogen sulfide has been employed in the foregoing example, other useful soluble sulfides adapted to effect precipitation of the insoluble sulfide include those of iron, barium or sodium sulfide. The gaseous hydrogen sulfide may be added by bubbling the same through the titanium solution, while the solid soluble sulfide, such as those indicated, may be added to the solution in desired quantity and in amount sufficient to effect desired precipitation.

As will be evident, I am enabled in my invention to recycle the heavy metal which yields an acid-insoluble sulfide in the titanium process and repeatedly use and reuse the same, thus affording an economically desirable process for their use in effecting titanium liquor clarifications.

I claim as my invention:

1. A process for preparing clarified titanium solutions useful in producing titanium oxide pigments comprising returning a sulfide-containing residue from a clarification operation to a titanium solution-preparing operation, oxidizing said insoluble sulfide to soluble state, and then clarifying the resultant titanium solution by precipitating said sulfide through reaction with a soluble sulfide.

2. In a cyclic process for the preparation of clarified titanium solutions wherein a sulfide coagulant is employed, the steps of returning the residual product containing precipitated heavy metal sulfide from the clarification operation of the process for oxidation and solubilization, to a subsequently prepared titanium solution, and clarifying the resultant heavy metal salt-containing solution by adding thereto a soluble sulfide.

3. In a cyclic process for the preparation of clarified titanium solutions, wherein sulfides of a heavy metal from the group consisting of arsenic, antimony, tin and copper are employed as clarification coagulants, the step of solubilizing the precipitated heavy metal sulfide present in a titanium clarification residue by subjecting the same to oxidation in a subsequently prepared titanium salt solution, and precipitating said solubilized sulfide to clarify the resultant titanium solution by adding a soluble sulfide thereto.

4. In a cyclic process for the preparation of clarified titanium solutions wherein an acid-insoluble heavy metal sulfide is employed as a clarification coagulant, the steps of returning the sulfide-containing residual muds to a subsequent titanium solution preparation operation, maintaining a ferric condition in said titanium solution during at least a portion of the dissolving operation, and clarifying the resulting solution by adding thereto a soluble sulfide.

5. In a process for the preparation of clarified titanium solutions from titanium ores, the steps of returning the heavy metal sulfide containing muds obtained from the settling of said solutions, to the ilmenite attack, dissolving the resulting attack mass while maintaining a ferric condition in the solution during a portion of the dissolving time, reducing the solution to avoid the presence of substantial amounts of ferric iron during clarification, and adding a soluble sulfide to the resultant solution to effect clarification through formation of a separable, heavy metal sulfide precipitate.

6. Method for recovering titanium values contained in residues obtained from titaniferous ore solutions which comprises heating ground titaniferous ore with concentrated sulfuric acid in admixture with a small amount of a compound of a metal selected from the group consisting of antimony, arsenic, copper and tin to initiate a reaction between the ore and acid, dissolving the resultant reaction mass in aqueous media, adding to this solution at least sufficient amount of a sulfide compound to form substantially completely the sulfide of the metal previously admixed with the ore and acid, allowing the thus-formed sulfide to settle out of suspension simultaneously carrying down suspended solid matter contained in the said solution, separating the thus clarified supernatant liquor from the settled residue and admixing a major portion of the said residue together with an additional smaller amount of the said metal compound to a subsequent ore-acid mixture.

7. Method of claim 6 wherein the metal compound employed is an antimony compound.

8. Method of claim 6 wherein the metal compound employed is an arsenic compound.

9. Method of claim 6 in which the metal compound employed is a copper compound.

10. A method for recovering titanium values present in residues produced from titaniferous ore solutions which comprises clarifying a titanium salt solution in the presence of a heavy metal sulfide coagulant precipitated by interacting an acid-soluble sulfide with a soluble salt of said heavy metal, recovering the insoluble, sulfide-containing residue produced as a result of said clarification, and returning said residue to a titanium solution preparation operation for reuse in the system and wherein sulfides present are oxidized and solubilized.

11. A method for recovering titanium values present in residues produced from titaniferous ore solutions which comprises clarifying a titanium sulfate solution in the presence of a heavy metal sulfide coagulant precipitated by interacting an acid-soluble sulfide with a soluble salt of said heavy metal, recovering the insoluble, sulfide-containing residue produced as a result of said clarification operation, and returning said residue for reuse in the system to an acid-ore solubilizing stage thereof wherein sulfides present become oxidized and solubilized.

12. A cyclic process for the preparation of a clarified titanium solution useful in the production of titanium oxide pigments, comprising subjecting said solution to clarification in the presence of a small amount of a heavy metal sulfide, recovering the insoluble, sulfide-containing residue produced in said clarification step, returning said recovered residue to an acid-titaniferous ore solubilizing stage of the system, oxidizing the insoluble sulfide present therein to soluble condition, and clarifying the resulting titanium solution by precipitating said sulfide through interaction with a soluble sulfide.

13. A cyclic process for the preparation of clarified titanium solutions useful in the production of titanium oxide pigments, comprising clarifying a titanium sulfate solution in the presence of an amount of a sulfide of a heavy metal from the group consisting of arsenic, antimony, tin and copper, adapted to yield a sulfide precipitate in acid media, ranging from about .1 to 1 gram, calculated as the oxide, per liter of solution to be clarified, recovering the insoluble, sulfide-containing residue produced as a result of said clarification, returning the recovered residue to a sulfuric acid-titaniferous ore solubilizing operation of the system, oxidizing said insoluble sulfide to soluble state, and then clarifying the titanium sulfate solution produced in said solubilizing stage by precipitating the sulfide present through interaction with a soluble sulfide.

14. In a process for the preparation of clarified titanium solutions from titaniferous ore and sulfuric acid attack, the steps of conducting the sulfuric acid attack in the presence of a heavy metal sulfide-containing residue from the clarification operation and an added minor amount of a compound of a heavy metal which yields a sulfide precipitate in acid media, oxidizing said heavy metal sulfide, dissolving the resulting attack mass to give an acid liquor, and then adding an acid-soluble sulfide to said liquor to cause the added heavy metal to be precipitated as the sulfide.

15. In a process for the preparation of clarified titanium solutions from titaniferous ore and sulfuric acid attack, the steps of conducting the sulfuric acid attack in the presence of the recycled heavy metal sulfide-containing residue from the clarification operation containing an added minor amount of a compound of a heavy metal from the group consisting of arsenic, antimony, tin and copper, which yields a sulfide precipitate in acid media, oxidizing said heavy metal sulfide, dissolving the resulting attack mass to give an acid liquor, and then adding an acid-soluble sulfide to said liquor to cause the added heavy metal to be precipitated as the sulfide.

16. In a process for the preparation of clarified titanium solutions from sulfuric acid attack of titaniferous ores, the steps of conducting said acid attack in the presence of the residual product from the clarification stage of the process containing a heavy metal sulfide and from about .1 gram to 1 gram per liter of solution to be clarified, and calculated as the oxide, of a heavy metal from the group consisting of arsenic, antimony, tin and copper adapted to yield a sulfide precipitate in acid media, oxidizing said heavy metal sulfide, dissolving the resultant attack mass to produce an acid liquor, and adding an acid-soluble sulfide to said liquor to precipitate said heavy metal as the sulfide.

17. In a process for the preparation of clarified titanium solutions from sulfuric acid attack on ilmenite, the steps of conducting said attack in the presence of the residual product from the clarification stage of the process containing a heavy metal sulfide and from about .2 to .5 gram of arsenic oxide per liter of solution to be clarified, oxidizing said heavy metal sulfide, dissolving the resulting attack mass to produce an acid liquor, and then adding hydrogen sulfide to said liquor to precipitate arsenic sulfide.

IGNACE JOSEPH KRCHMA.